Oct. 13, 1964  R. F. ZITKO  3,152,843
CONTROL MECHANISM WITH SELF RESETTING MEANS
Filed Dec. 18, 1961
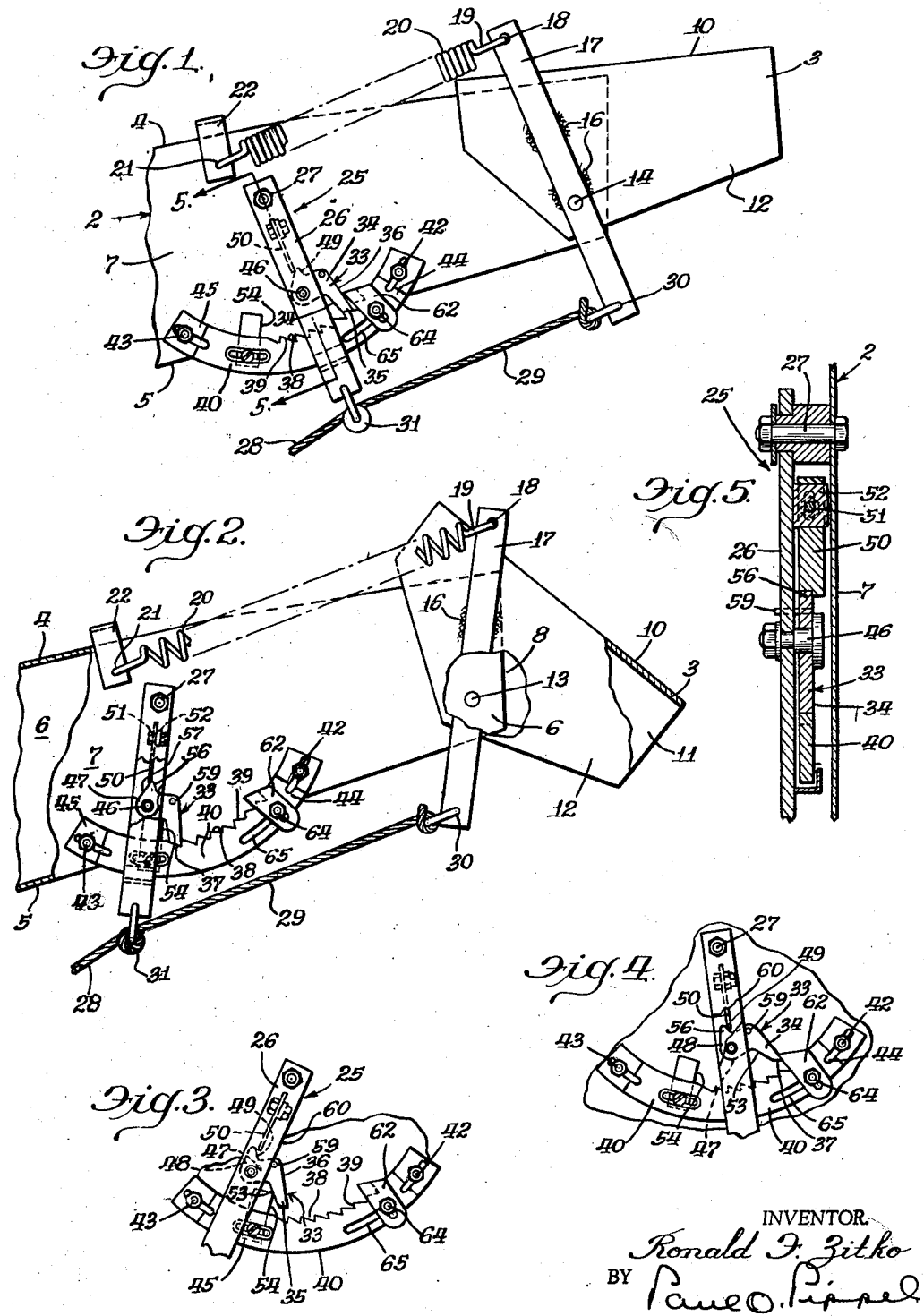
INVENTOR.
Ronald F. Zitko
BY Paul O. Pippel
Atty.

United States Patent Office 3,152,843
Patented Oct. 13, 1964

3,152,843
CONTROL MECHANISM WITH SELF RESETTING MEANS
Ronald F. Zitko, Cicero, Ill., assignor to International Harvester Company, Chicago, Ill., a corporation of New Jersey
Filed Dec. 18, 1961, Ser. No. 160,183
9 Claims. (Cl. 302—61)

This invention relates to a control mechanism particularly, though not necessarily, limited to means for operating a deflector guiding crops discharging from an elevator or chute into a wagon or place of storage.

A general object of the invention is to provide a novel, simple, and effective deflector control which may be operated simply by a pullrope advancing the rope in one direction.

A further object of the invention is to provide a novel step-by-step latching mechanism which will positively hold the deflector in selected position.

The invention contemplates a novel mechanism for controlling the position of the deflector, the mechanism having a novel tooth rack which is engaged by a pawl, the pawl being held in engaging position with the teeth of the rack as the tooth is advanced along the rack and the mechanism providing a trip at the end of the rack to disengage the tooth from the rack and permit advance of the tooth to the leading end of the rack without a necessity for shifting back through each increment of adjustment.

These and other objects and advantages inherent in and encompassed by the invention will become more readily apparent from the specification and the drawings, wherein:

FIGURE 1 is a fragmentary side elevational view of a chute and deflector with the novel control mechanism applied thereto showing the parts in uppermost position;

FIGURE 2 illustrates the parts in lowermost position;

FIGURE 3 illustrates in side elevation the setting device in tooth-retracted position for return;

FIGURE 4 illustrates the structure of FIGURE 3 in its advanced position preparatory to the tooth being set to operating position; and FIGURE 5 is a sectional view taken substantially on the line 5—5 of FIGURE 1.

Describing the invention in detail and having particular reference to the drawings, there is shown a discharge chute 2 and a deflector therefor 3. The chute 2 is preferably of rectangular configuration and comprises top and bottom walls 4 and 5 and side walls 6 and 7 interconnecting the top and bottom walls. The chute 2 terminates in that open ended discharge extremity 8 over which is telescoped the deflector 3. The deflector 3 is a U-shaped structure in end view and comprises a top wall 10 and side walls 11 and 12, the top wall 10 projecting over the top wall 4 at the discharge extremity 8 of the chute and the side walls 11 and 12 disposed outwardly of the walls 6 and 7 and flanking and paralleling the same.

The side walls 11 and 12 of the deflector are pivoted on pins or rivets 13 and 14 from the respective side walls 6 and 7 on a common, substantially horizontal, transverse axis whereby the deflector is swingable to a position substantially in axial alignment with the chute 2 and incrementally to its downwardmost position as shown in FIGURE 2 whereby the crops issuing from the discharge extremity 8 of the discharge chute are progressively deflected in order to control the deposition of the crops in any selected confine such as, for example, a trailing wagon of a forage harvester, wherein the chute 2 is part of the structure of the harvester.

The wall 12 is integrally united as by welding at 16 to a lever member 17 which is pivoted with the wall 12 on the pin 14, the lever member 17 extending vertically and projecting above the top wall 10 of the chute and being connected as at 18 to the forward end 19 of the tension spring 20 which at its rear end is connected as at 21 to a bracket 22 which is suitably affixed to the side wall 7 of the chute 2. Thus it will be seen that the lever 17 as well as the deflector are constantly biased to axially align the position with respect to the chute that is constantly being biased in a counterclockwise direction as seen in FIGURE 1.

In order to overcome the load posed by the spring 20 there is provided an incremental setting mechanism generally designated 25. The mechanism 25 includes a pawl-carrying swinging arm 26 which is pivotally connected in a substantially horizontal transverse axis at its upper end by a pin 27 which is mounted on the wall 7 on the chute. The arm 26 pendulates in accordance with the movement of the arm 17 being connected therewith by means of the flexible link means or cable 28 which has a length 29 extending between and pivotally connected as at 30 and 31 to the lower ends respectively of the arms 17 and 26. Thus it will be seen that the action of the spring means 20 intending to rotate the arm 17 as well as the deflector 3 connected thereto in a counterclockwise direction maintains a tensile load on the length 29 between the connections 30 and 31, thus continuously urging or biasing the arm 26 in a counter-clockwise direction. The movement of the arm 26 in the raising direction of the deflector is resisted and prevented by the pawl structure 33 which comprises a bellcrank-shaped pawl member having a dependent tooth portion 34 with a downwardly pointed end portion 35 which is defined by the substantially straight transversely vertical forward edge 36 of the tooth and a diagonal upwardly rearwardly defined bottom edge 37 of the tooth. The profile of the lower tooth end corresponds to that of the cavity 38 defined between the teeth 39, 39 on the arcuate rack 40 which is substantially concentric with the axis of the pin 27. It may be observed that the rack 40 has the teeth 39 provided in its upper edge and that the rack segment 40 is connected as by bolting at 42, 43 to the side walls 7 of the chute. It will be readily perceived that as the arm 26 is swung rearwardly, the lower end of the tooth 34 will progressively slide over the respective teeth 39 from the initial end 44 of the rack to the terminal end 45 of the rack upon the rope 28 being pulled by the operator in the leftward direction as seen in FIGURES 1 and 2. Escapement of the tooth 34 over the teeth 39 is accomplished by the pawl mechanism 33 swinging about a substantially horizontal axis about a pin 47 which is mounted on the arm 26 intermediate its ends above the rack 40, the pawl 33 being somewhat Z-shaped and having a portion 47 extending rearwardly from the upper end of the tooth 33 and at its rear extremity merging and joining with an upwardly directed cam lobe portion 48 which has a back camming edge 49 engaged by the lower end of the leaf spring 50 which at its upper end is suitably secured as at 51 to a lug 52 mounted on the arm 26 adjacent to its upper end. It will be realized that as long as the tooth 33 remains in engaging position with the teeth 39, the spring 50 biases the pawl 33 in a clockwise direction urging the tooth end 34 downwardly. As the pull on the cable 28 continues past the endmost or rearmost tooth 39, the back edge 53 of the pawl 33 engages a stop or abutment 54 which is secured to the upper edge of the cam track or tooth track 40 in the path of the tooth portion 34. The abutment or trip means 54 causes the pawl 33 to swing upwardly out of engagement with the track and, at the same time, the upper end 56 of the cam lobe portion 48 swings under the lower end of the spring 50 whereupon the spring 50, as best seen in FIGURE 4, engages with the forward side 57 of the lobe portion 48 holding the tooth portion 34 out of engagement with the rack. Movement of the pawl 33 to disengaged position is limited by a stop 59 on the upper end of tooth portion 34 which engages with the forward side 60 of the lever or arm 26. This is best illustrated in FIGURE 4. It will be readily appreciated that in this position there is no restraint for the apparatus to return to its original position as shown in FIGURE 1 except for the operator holding onto the pullrope 28. As soon as he releases the same, the apparatus moves from the position shown in FIGURE 2 to that shown in FIGURE 1 and, as best seen in FIGURE 2 the forward side 36 of the tooth portion 34 engages a forward stop 62 which is carried at the forward end 44 of the rack. This movement in view particularly of the greater strength of the spring 20 over the strength of the spring 50 resets the pawl by swinging the pawl 33 downwardly, that is, in a clockwise direction as seen in the drawings, particularly FIGURE 4, thus overriding the spring 50 whereby the spring 50 is deflected forwardly and the cam lobe is caused to move in front of the spring 50 to the position shown in FIGURES 1 and 2. It will be readily realized that the forward stop 62 is mounted on a bolt 64 which is disposed within an arcuate slot 65 concentric with the member 40 so that the stop can be set in various positions to control the initial disposition of the deflector 3. The rear abutment 54 is adjustable by shifting the rack 40 back and forth.

Thus it will be seen that a novel and effective and simple mechanism has been provided which is entirely foolproof in operation and which positively effects and controls the disposition of the deflector such that a single and simple pullrope arrangement is required.

What is claimed is:

1. The combination of a material conveying chute having a discharge end and a deflector pivoted on the chute over said end in deflecting relation to material discharging therefrom, means for pivoting the chute comprising an arm pivoted to the chute, a toothed segment supported on the chute adjacent to the arm, a dog pivoted on the arm having a tooth engageable with the segment, an operator means connected to the arm for swinging the same and moving the dog across the teeth, means connecting the arm with the deflector for swinging the same in accordance with movements of the arm, said dog having cam means, biasing means on the arm engageable with said cam means for normally urging the dog into engaging position with the teeth, said segment having stop means spaced lengthwise thereof in the path of movement of the dog, one of said stop means engageable with the dog at one end of its movement for swinging in a direction away from the teeth on the segment in overriding relation to said biasing means and accommodating return movement of the arm to initial position, said other stop engageable with the dog at the initial end of the section for camming it into position reengaging the dog with the teeth.

2. In a step-by-step adjusting control mechanism, the combination of a support, a toothed rack thereon, an arm pivoted on the support and swingable alongside the rack, a dog pivoted to the arm and having a cam lobe at one end and a tooth at the other end, biasing means reacting between the arm and lobe and selectively releasably holding the dog in engaging and disengaged positions with respect to the rack, and trip means spaced along the rack and engageable with the dog to trip the same into disengaged position upon the arm swinging beyond a predetermined limit in one direction and for tripping the dog into engaging position upon the arm being moved in an opposite direction beyond a certain limit.

3. A multiple position self-resetting control mechanism comprising a track having a plurality of ratchet teeth, a control element, means supporting said element for control movement in a direction parallel to the track and for return movement in the opposite direction, a pawl carried by the control element for pivotal movement into operative and inoperative relation with the teeth of the track, said pawl having cam means, means on the control element in engagement with the cam means for holding the pawl in either of said positions, and abutment means supported in the path of the pawl in said control direction of movement for camming the pawl to inoperative position, and other abutment means supported in the path of the pawl in said return direction of movement for camming the pawl into operative position.

4. The invention according to claim 3 and at least one of said abutment means adjustable to different positions along the track.

5. The invention according to claim 3 and said cam means comprising a cam lobe, and said means in engagement with the pawl comprising a leaf spring having one end secured to the element and the other end disposed at one side of the lobe in said inoperative position of the pawl and at the opposite side of the lobe in the operative position of the pawl.

6. A self-resetting control mechanism comprising a stationary control track having a series of ratchet teeth thereon, a pawl normally initially positioned at one end of the track in engagement with an adjacent tooth, a swingably mounted control arm supporting the pawl for step movement over the ratchet teeth and toward the end of said track opposite said one end, spring loaded overcenter means yieldably holding the pawl in a first position engaging the teeth and in a second position disengaged from the teeth, means biasing said control arm toward said one end of the track, means operable adjacent said opposite end of the track for shifting the pawl into said second position out of engagement with the track, and means adjacent said one end of said track for shifting the pawl into said first position into engagement with the ratchet teeth attendant to said pawl engaging said last-mentioned means.

7. The invention according to claim 6 wherein the means adjacent said one end of the track is positionable to different positions along the track for shortening the extent of movement of the control arm between said ends of the track.

8. The invention according to claim 6 and an operating arm pivotally supported intermediate its ends, spring means biasing said operating arm in a first direction and connected to one end thereof and linkage connecting the other end of the operating arm with the control arm.

9. The invention according to claim 6 and having a support structure, and means adjustably mounting said track on the support structure for positioning the track in a plurality of positions whereby affecting movements of said control arm.

References Cited in the file of this patent
UNITED STATES PATENTS 2,670,839    Aasland _____ Mar. 2, 1954
2,741,512    Stott _____ Apr. 10, 1956